United States Patent [19]
Iwane

[11] Patent Number: 5,285,479
[45] Date of Patent: Feb. 8, 1994

[54] QUADRATURE MODULATION CIRCUIT

[75] Inventor: Yasushi Iwane, Hyogo, Japan

[73] Assignee: Mitsubishi Denki Kabushiki Kaisha, Tokyo, Japan

[21] Appl. No.: 791,228

[22] Filed: Nov. 13, 1991

[30] Foreign Application Priority Data

Jan. 11, 1991 [JP] Japan .................................. 3-12645

[51] Int. Cl.⁵ ........................ H04L 27/04; H04L 27/12; H04L 27/20
[52] U.S. Cl. .......................................... 375/59; 375/60; 332/103
[58] Field of Search ............... 375/39, 59, 60, 67, 375/80; 332/103; 364/724.04, 724.13

[56] References Cited

U.S. PATENT DOCUMENTS

| | | | |
|---|---|---|---|
| 3,971,996 | 7/1976 | Motley et al. | 375/39 X |
| 4,327,439 | 4/1982 | Göckler et al. | 375/67 |
| 4,613,976 | 9/1986 | Sewesinson et al. | 332/103 X |
| 4,881,049 | 11/1989 | Yagi | 332/103 |
| 4,990,867 | 4/1988 | Ogura et al. | |
| 5,091,705 | 2/1992 | Hiramatsu et al. | 375/67 X |
| 5,140,613 | 8/1992 | Birgenheier et al. | 332/103 X |
| 5,144,256 | 9/1992 | Lim | 375/80 X |

FOREIGN PATENT DOCUMENTS 63-77246   4/1988   Japan .

Primary Examiner—Curtis Kuntz
Assistant Examiner—Bryan Webster
Attorney, Agent, or Firm—Rothwell, Figg, Ernst & Kurz

[57] ABSTRACT

A quadrature modulation circuit includes a low pass filter which operates by a time division process for the in-phase channel and quadrature-phase channel, and reduces address requirements data using amplitude symmetry of the wave form and/or using symmetry wave form on the time axis. The capacity of the ROM is reduced by half or more and the configuration of the quadrature modulation circuit is simplified.

14 Claims, 10 Drawing Sheets (a)

(b)

(a)

(b)

QUADRATURE MODULATION CIRCUIT

BACKGROUND OF THE INVENTION

1. Field of the Invention

The invention relates to a quadrature modulation circuit. In particular, the present invention relates to a quadrature modulation circuit which includes a base band wave reshaping circuit used for digital modulation such as four phase shift keying modulation (QPSK) in which the frequency band is limited by the digital transmission system.

2. Description of the Prior Art

FIG. 8 shows a block diagram of a conventional quadrature modulation circuit used for QPSK. In FIG. 8, an in-phase channel signal $1_i$(I-ch) and a quadrature-phase channel signal $1_q$ (Q-ch) are non-return-to-zero (NRZ) input signals. Low pass filters (ROM LPF) $2_i$ and $2_q$ are read only memories (ROM) respectively which operate as band limitation filters for I-ch and Q-ch. Digital to analog converters (D/A converter) $3_i$ and $3_q$ convert the digital signals which are received from the ROM LPF $2_i$ and ROM LPF $2_q$ to analog signals. Analog filters $4_i$ and $4_q$ suppress the step aliases received from the D/A converters $3_i$ and $3_q$. A quadrature modulation circuit 5 which includes a phase shifter 51, multipliers 52, 53 and an adder 54 modulate a carrier orthogonally with the output signals of the analog filters $4_i$ and $4_q$. An oscillator 6 supplies the modulation carrier signal to the quadrature modulation circuit 5.

FIG. 9 shows a block diagram of the low pass filters (ROM LPF) $2_i$ and $2_q$ in FIG. 8. In FIG. 9, an input signal 1 corresponds to the in-phase channel signal $1_i$ (I-ch) and the quadrature channel signal $1_q$ (Q-ch). An n-step shift register 21 shifts the input signal 1 in sequence. An oscillator 22 generates a clock signal corresponding to the sample frequency of the ROM LPF $2_i$ and $2_q$. A ROM 24 stores the resulting data of the wave form from the filter.

FIG. 10 shows another block diagram of the low pass filters (ROM LPF) $2_i$ and $2_q$ in FIG. 8. A pair of n/2-step shift registers 211 and 212 shift the first half cycle of the input signal and the second half cycle of the input signal respectively. ROMs 241 and 242 store the different wave forms. An adder 25 adds the values received from the ROMs 241 and 242.

The operation of the above conventional art is explained hereinafter. In the digital modulation, such as QPSK, since the frequency component spreads over a wide range, the frequency of the modulated output signal is limited by band limitation filter. A QPSK signal S(t) limited in the base band frequency is expressed in the following equation (1).

$$\begin{aligned} S(t) &= I(t)\cos\omega_c t - Q(t)\sin\omega_c t \\ I(t) &= \sum_{k=-\infty}^{\infty} I_k \cdot h(t - kT) \\ Q(t) &= \sum_{k=-\infty}^{\infty} Q_k \cdot h(t - kT) \end{aligned} \quad (1)$$

where $\omega_c$ is a carrier frequency, $I_k$ and $Q_k$ are the digital signals of I-ch and Q-ch and have the value of +1 or −1 and h (t) is the impulse response of the band limitation filter. A nyquist filter having the characteristics of a raised-cosine roll-off is used for the band limitation filter.

The operation of FIG. 8 is explained by referring the equation (1). An in-phase channel signal $1_i$ (I-ch) and a quadrature channel signal $1_q$ (Q-ch) are inputted to the low pass filters (ROM LPF) $2_i$ and $2_q$ respectively by the form of NRZ signal $I_k$ and $Q_k$. Input signals $I_k$ and $Q_k$ are convoluted to form impulse responses in the low pass filters (ROM LPF) $2_i$ and $2_q$ respectively. Smoothed wave forms I (t) and Q (t) are outputted as sampled and quantized numerical data from the low pass filters (ROM LPF) $2_i$ and $2_q$ respectively. These output data are inputted to the D/A converters $3_i$ and $3_q$ respectively and converted into analog signals. The analog filters $4_i$ and $4_q$ smooth the step data converted to the analog signals, suppress the aliases generated at the sampling process, and the output signals I (t) and Q (t) are inputted to the quadrature modulator 5. In the quadrature modulator 5, the carrier signal generated in the generator 6 is distributed into two quadrature carriers $-\sin \omega_c$ and $\cos \omega_c$ which is shifted 90 degrees using a shifter 51. These two carrier signals are applied to multipliers 52 and 53 and are multiplied by the output signals I (t) and Q (t) received from the analog filter $4_i$ and $4_q$ respectively. The two outputs from the multipliers 52 and 53 are added in an adder 54 and are outputted as a modulation wave form S (t).

The operations of the ROMs LPF $2_i$ and $2_q$ are explained by using FIG. 9 and FIG. 11. The operation of the LPF can be considered as the convolution of the input signal and the impulse response of the LPF. Therefore, they are expressed as the second and the third equations of equation (1).

FIG. 11 shows the convolution result of the equation (1). In FIG. 11, numeral 7 shows input impulse row ($I_k$ or $Q_k$). The upward arrow shows "1" and downward arrow shows "0". 8 is an impulse response wave form [$I_k \cdot h(t-kT)$ or $Q_k \cdot h(t-kT)$] of the LPF for each input impulse 7. These impulse response wave forms [$I_k \cdot h(t-kT)$ or $Q_k \cdot h(t-kT)$] are shown in dotted lines. 9 is a filter output wave from [I (t) or Q (t)] in which all impulse response wave forms are added. The filter output wave form [I (t) or Q (t)] is shown in solid line.

The range k of $\Sigma$ is $k = -\infty$ to $\infty$. As easily known from each impulse response wave form 8 in FIG. 11, the value of the impulse response becomes negligibly small where $|k|$ is very large. Therefore, the impulse response can be restricted within the finite range. In this example, 5 symbols before and 5 symbols after a certain symbol (total symbols are 10) are used for calculating the convolution of the impulse response. In this case, the impulse response wave form between the "5" symbol and "6" symbol shown in the solid line is calculated using 10 symbols shown in FIG. 11. When the convolution is calculated from the finite impulse response, the filter output wave form I (t) or Q (t) is obtained as the summation of all impulse response wave forms corresponding to each 10 symbols. That is, the impulse response wave form between the "5" symbol and "6" is calculated from only 10 symbols of "1" to "10" symbols.

FIG. 9 shows a ROM LPF which includes the ROM 24 for storing the wave form described above. In FIG. 9, digital signals $I_k$ or $Q_k$ (input signal 1) are inputted to the n-step shift register 21. The shift register 21 shifts the input data (symbol) in sequence and stores the most recent n symbols and outputs these n symbols to the address of the ROM 24. In this embodiment, as the 10 symbols are used, n is equal to 10.

All combination wave forms of n symbols are calculated beforehand and stored in the ROM 24. In this case, the wave form can not be processed continuously on the time axis. Therefore, the wave forms between two symbols are sampled on the time point of $2^m$ and the quantized data is stored in the ROM 24. The m bits output from the $2^m$ binary counter 23 which operates at the sampling clock received from the oscillator 22 is inputted to the ROM 24 as well as the n symbols received from the shift register 21. The ROM LPF in FIG. 9 operates as the LPF by selecting the output wave form stored in the ROM 24 at a time according to the address data constructed of n symbol data received from the shift register 21 and by reading in sequence the b $2^m$ sampling number between the two symbols which is selected according to the output value from the counter 23.

The capacity of the ROM 24 is decided by the referred symbol data n and the sampling number $2^m$ between the two symbols. For example, in the case of QPSK, as $I_k$ and $Q_k$ are expressed by one bit respectively, if n=10 and m=3, then the necessary capacity for the ROM 24 is $2^{(n+m)}=2^{13}=8K$ words respectively for each I-ch and Q-ch ROM. Further, if n becomes larger in order to make the truncation error of the impulse response smaller, the capacity of the ROM will be increasing exponentially.

FIG. 10 is a block diagram of ROMs LPF $2_i$ and $2_q$ configuration which is able to decrease the required capacity of the ROM 24 of FIG. 9. In FIG. 10, the operation of the low pass filter is modified, and expressed by equation (2) which is introduced from the second and third equations of equation (1) as follows.

$$I(t) = \sum_{k=-n/2}^{-1} I_k \cdot h(t-kT) + \sum_{k=0}^{n/2-1} I_k \cdot h(t-kT) \quad (2)$$

In equation (2), the range of the impulse response exists between finite n symbols.

The operation of the FIG. 10 is explained using FIG. 12 and equation (2). The filter output wave form is considered as the summation of the filter output wave forms shown in FIGS. 12(a) and (b). That is, the wave form of the FIG. 12(a) indicates the first term of the right side of equation (2) and FIG. 12(b) indicates the second term of the right side of the equation (2). The reference numbers 71~91 and 72~92 in FIG. 12 correspond to the number 7~9 in FIG. 11.

The wave forms shown in FIG. 12(a) and (b) are stored in a ROM 241 and 242 of FIG. 10 respectively in the same way as stored in the ROM 24 in FIG. 9. Each n/2 data from the shift registers 211 and 212 and m bit data from the counter 23 are inputted to the ROMs 241 and 242 respectively, and the corresponding data are read from the ROMs 241 and 242 respectively. The two output data from the ROM 241 are added in an adder 25. That is, the ROM 241 operates to calculates the first term of the right side of equation (2), the ROM 241 operates to calculates the second term of the right side of equation (2), and the adder 25 calculates the addition of the right side of equation (2).

The n data input is divided into two portions, and the first half n/2 data (k=−n/2~−1) is stored in the n/2 step shift register 211 and the second half n/2 data (k=0~n/2−1) is stored in the n/2 step shift register 212. The address data from the shift register 211 is outputted to the ROM 241, and the address data from the shift register 212 is outputted to the ROM 242. The m bits output from the counter 23 is inputted to the both ROM 241 and 242. The operation of the m bits output is the same as explained in the FIG. 9.

The capacity of the ROMs 241 and 242 in FIG. 10 is calculated as follows. For example, if n=10 and m=3, then the capacity of the both ROMs is $2^{(n/2+m)} \times 2 = 2^8 \times 2 = 512$ words. In the case of 16 QAM, 8 PSK and $\pi/4$ shifted DQPSK, the capacity of the ROM is $2^{(2 \times n/2+m)} \times 2 = 2^{13} \times 2 = 16K$ words.

As discussed above, the capacity of the ROM of FIG. 10 becomes smaller than that of FIG. 9. But, the capacity of the ROMs 241 and 242 still occupies a considerable amount of memory in the quadrature modulation circuit of FIG. 8. It is also necessary to provide two sets of the same ROM in the quadrature modulation circuit for each I-ch and Q-ch.

There is prior art, for example, laid-open Japanese patent publication No. 63-77246/1988, which describes such quadrature modulation.

As the conventional quadrature modulation is constructed as discussed above, it is necessary to provide a large capacity ROM LPF $2_i$ and ROM LPF $2_q$ for each I-ch and Q-ch respectively.

It is a primary object of the present invention to provide a quadrature modulation circuit which requires small capacity ROMs for operating as filters.

It is a further object of the present invention to reduce the hardware size compared with the prior art quadrature modulation circuit having ROMs for operating as filters.

It is a further object of the present invention to reduce the ROM size by using the amplitude symmetry of the wave form.

It is a still further object of the present invention to reduce the ROM size by using the symmetry of the wave form on the time axis.

SUMMARY OF THE INVENTION

A quadrature modulation circuit includes at least a low pass filter for limiting the frequency band of the in-phase channel and the quadrature channel, along with at least a D/A converter for converting the digital signals received from the low pass filters to analog signals. The quadrature modulation circuit also includes at least a filter for suppressing the aliases outputted from the D/A converters and a quadrature modulator for modulating the outputs from the filters. In the quadrature modulation circuit, the low pass filters operate by a time division sequence for the inphase channel and the quadrature channel. The low pass filters also use one symbol as a sign data and invert the sign of the remaining symbol data and that of the data read out from the ROM. The low pass filters divide the reference data into the first half portion and the second half portion, and read out of the contents from the ROM for the forward direction of the time axis at the first half portion, and for the backward direction of the time axis at the second half portion.

BRIEF DESCRIPTION OF THE DRAWING

FIG. 7b shows a block diagram of another construction of the ROM LPF of FIG. 6.

DETAILED DESCRIPTION OF THE PREFERRED EMBODIMENTS

Figure 1:
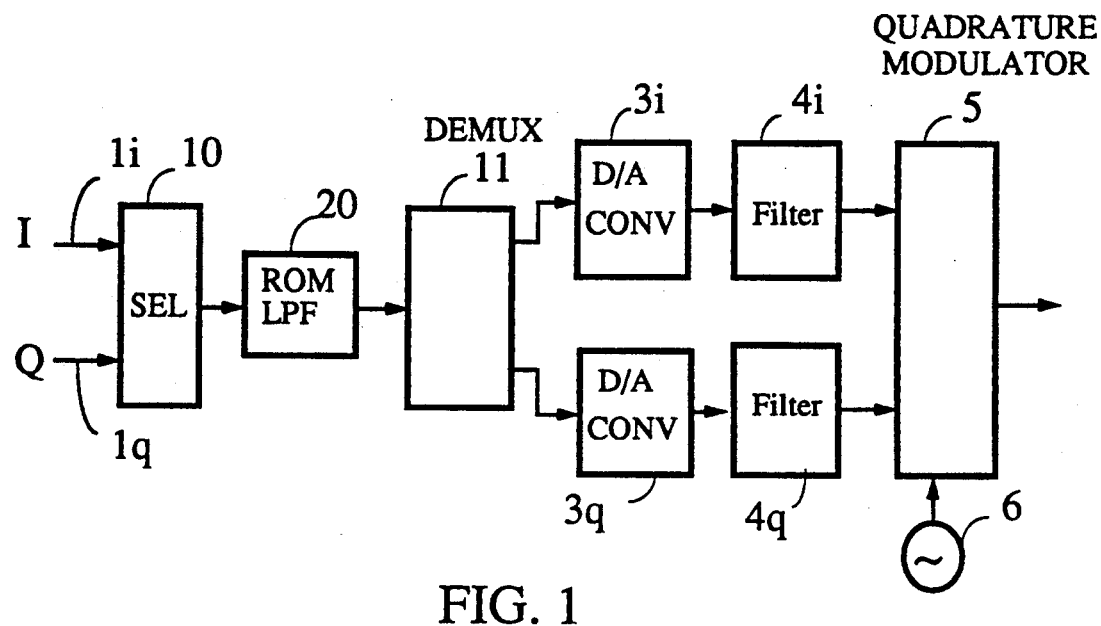
FIG. 1 shows a block diagram of a first embodiment of a quadrature modulation circuit of the present invention.
Figure 8:
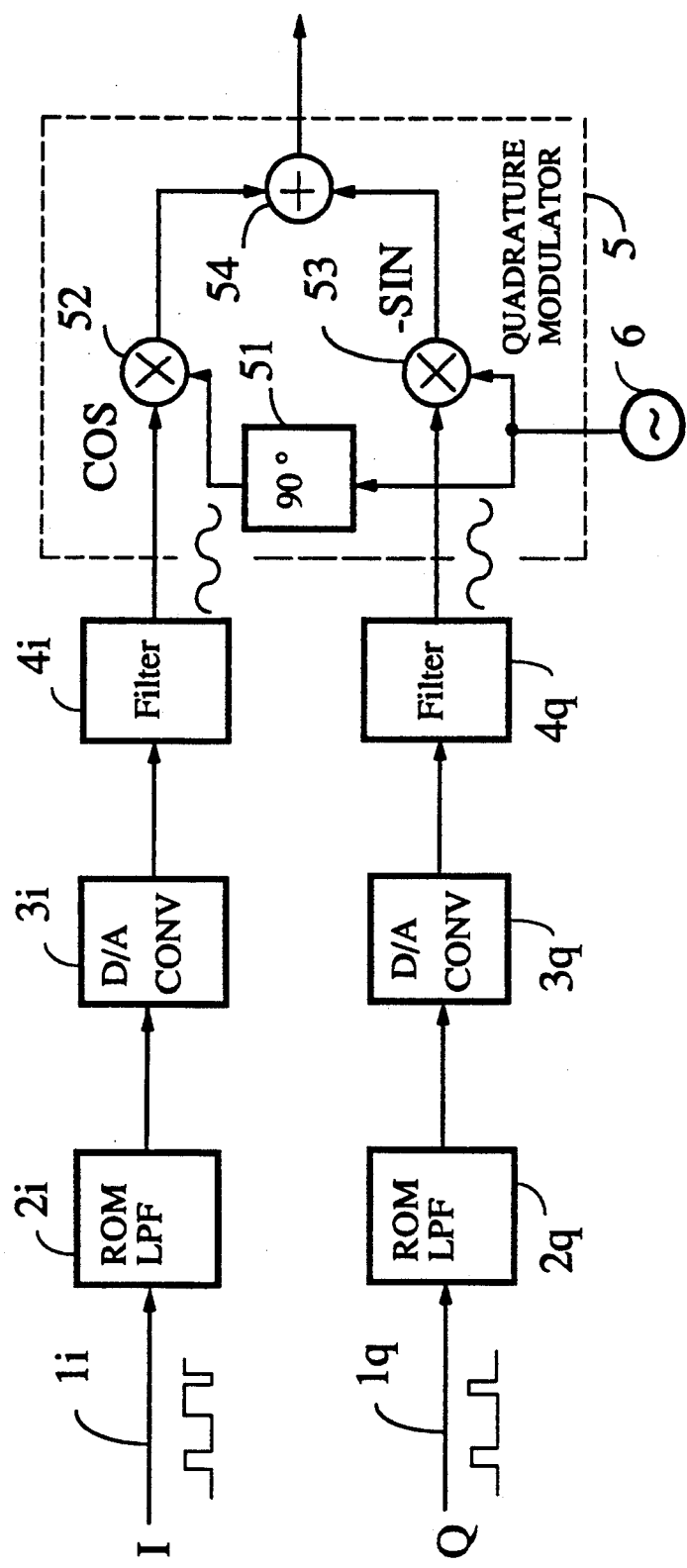
FIG. 8 shows a block diagram of a conventional quadrature modulation circuit.

FIG. 1 shows a first embodiment of the present invention. In FIG. 1, signals $1_i$ and $1_q$ are inputted signals of I-ch and Q-ch respectively. A selector 10 switches the input signals $1_i$ and $1_q$ to a ROM 20 by a time division process. A ROM 20 is a ROM LPF which stores a half of the wave form data using the symmetry characteristic of the wave form data. The adoption of the ROM LPF decreases the capacity of the memory. A demultiplexer 11 demultiplexes the output signal from the ROM 20 by a time division process. D/A converters $3_i$ and $3_q$ convert the input digital signals into analog signals for the I-channel and the Q-channel respectively. Analog filters $4_i$ and $4_q$ smooth the analog signals, suppress the aliases generated at the sampling process, and output I (t) and Q (t) signals to the quadrature modulator 5 respectively. A quadrature modulator 5 modulates the input I (t) and Q (t) signals with the distributed two signals in the same manner as explained in FIG. 8. An oscillator 6 supplies the modulation carrier signal to the quadrature modulator 5.

Figure 2:
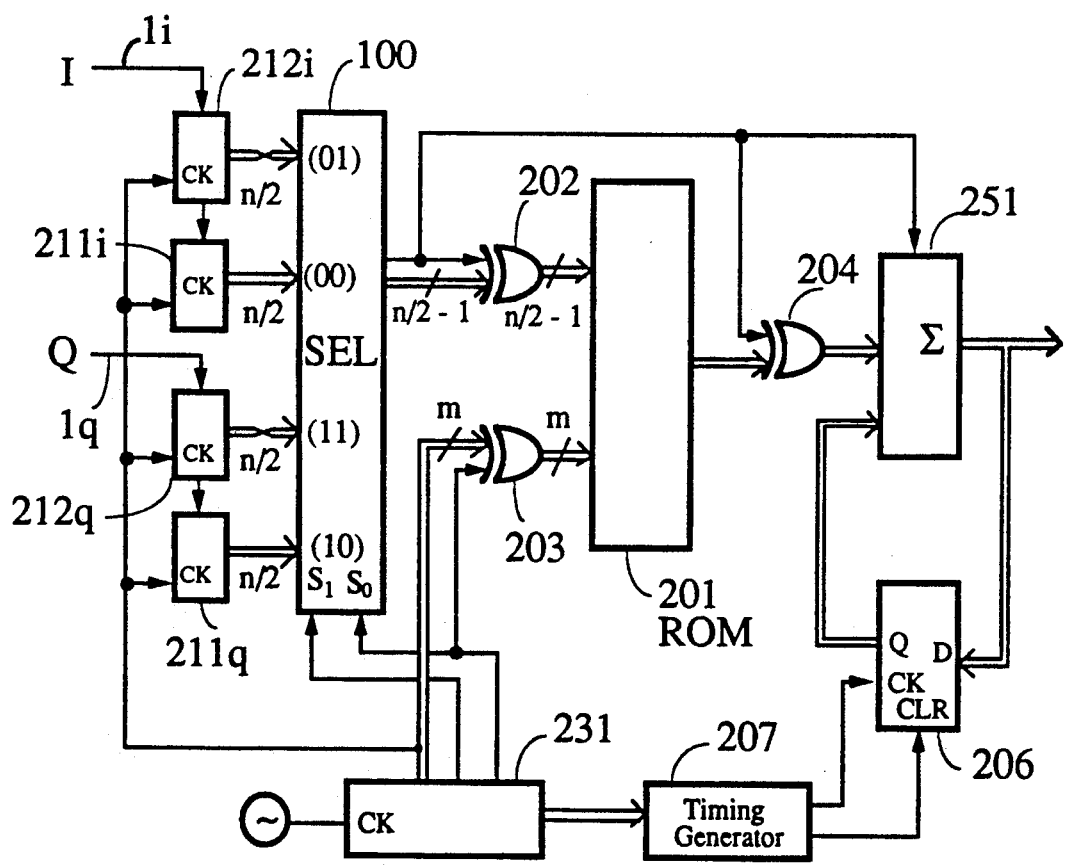
FIG. 2 shows a block diagram of a construction of a ROM LPF of the embodiment of FIG. 1.

FIG. 2 shows a block diagram of the selector 10 and the ROM LPF 20 of FIG. 1. In FIG. 2, n/2 step shift registers $211_i$, $211_q$, $212_i$ and $212_q$ shift the input $1_i$ and $1_q$ signals in sequence respectively. A selector 100 selects one of the outputs from the shift registers $211_i$, $211_q$, $212_i$ and $212_q$. Exclusive ORs 202 and 204 operate so that the amplitude symmetry of the wave form is used for calculating the output signal. Exclusive OR 203 operates so that the symmetry of time axis of the wave form is used for calculating the output signal. A ROM 201 is addressed by the outputs of the exclusive ORs 202 and 203 and outputs the data to an exclusive OR 204. An adder 251 adds the output from the exclusive OR 204. A latch circuit 206 latches the output from the adder 251 and uses it for the succeeding addition. An oscillator 221 generates a clock signal which is supplied to a counter 231 for counting the clock. A timing generator 207 generates the latch clock signal (CK) and clear signal (CLR) for the latch circuit 206 from the clock signal received from the counter 231.

The operation of the first embodiment is explained hereinafter using FIG. 1 and FIG. 2. In FIG. 1, signals $1_i$ and $1_q$ are inputted to the selector 10. The selector 10 switches the input signals $1_i$ and $1_q$ to the ROM LPF 20 by a time division process. The ROM LPF 20 stores the filtered wave form data. Needed memory of which is reduced by utilizing the symmetric characteristics of the wave form. The same ROM LPF 20 is used both for the in-phase channel and the quadrature channel by a time division process. The demultiplexer 11 demultiplexes the output signal from the ROM LPF 20 and sends it to the D/A converters $3_i$ and $3_q$ by a time division process. Each D/A converter $3_i$ and $3_q$ converts the input digital signal into an analog signal. Each analog filter $4_i$ and $4_q$ smoothes the analog signal, suppresses the aliases generated at the sampling process, and outputs I (t) and Q (t) signals to the quadrature modulator 5 respectively. The quadrature modulator 5 modulate a carrier orthogonally with the output signals of the analog filters $4_i$ and $4_q$.

More detailed explanation is made in connection with the ROM LPF 20 of FIG. 1 using FIG. 2, FIG. 3, FIG. 4 and FIG. 13.

Firstly, it is explained how the required capacity of the ROM is reduced by half compared with the prior art using the symmetry characteristic of the signal wave form on the time axis.

Figure 3:
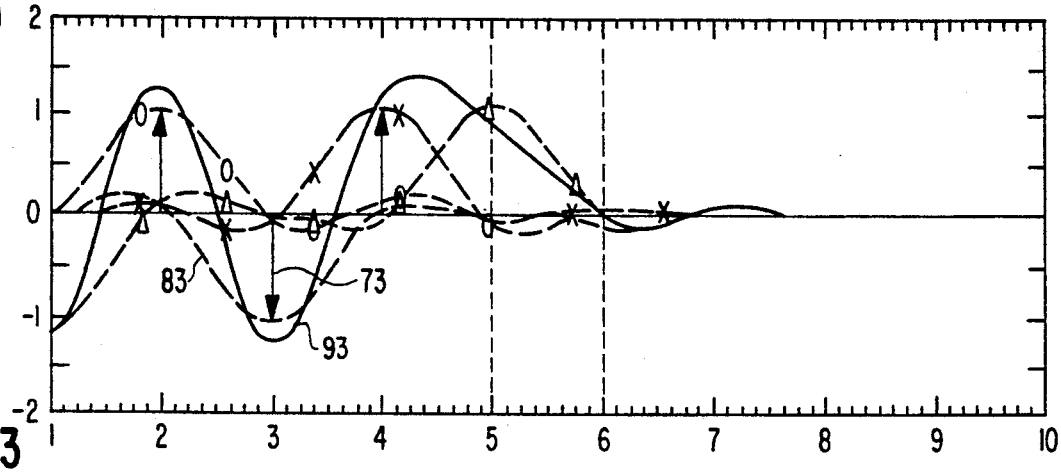
FIG. 3 shows the symmetrical signal wave form on the time axis.
Figure 3:
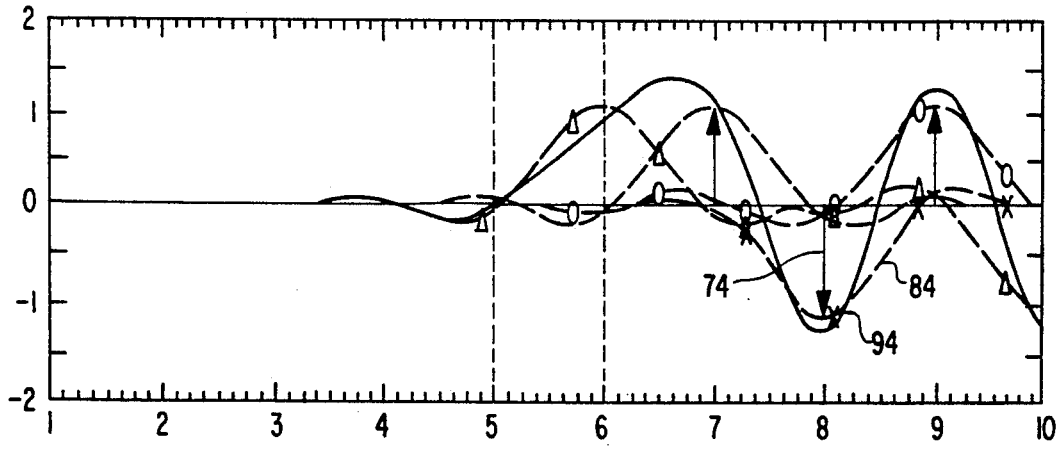

FIG. 3 shows the symmetrical characteristic of the signal wave form on the time axis. Numerals 73 and 74 are inputted impulse rows respectively, and numerals 83 and 84 are impulse responses for each input impulse. Numerals 93 and 94 are outputted signal wave forms from the filter which are obtained as the summation of all impulse responses 83 and 84 respectively. As discussed above, in the conventional art, it is necessary to provide the ROMs 241 and 242 for storing the first half n/2 symbols and the second half n/2 symbols respectively. But, the data stored in the ROM 241 is the same as the data stored in the ROM 242 in which the data address is reversely arranged.

Figure 10:
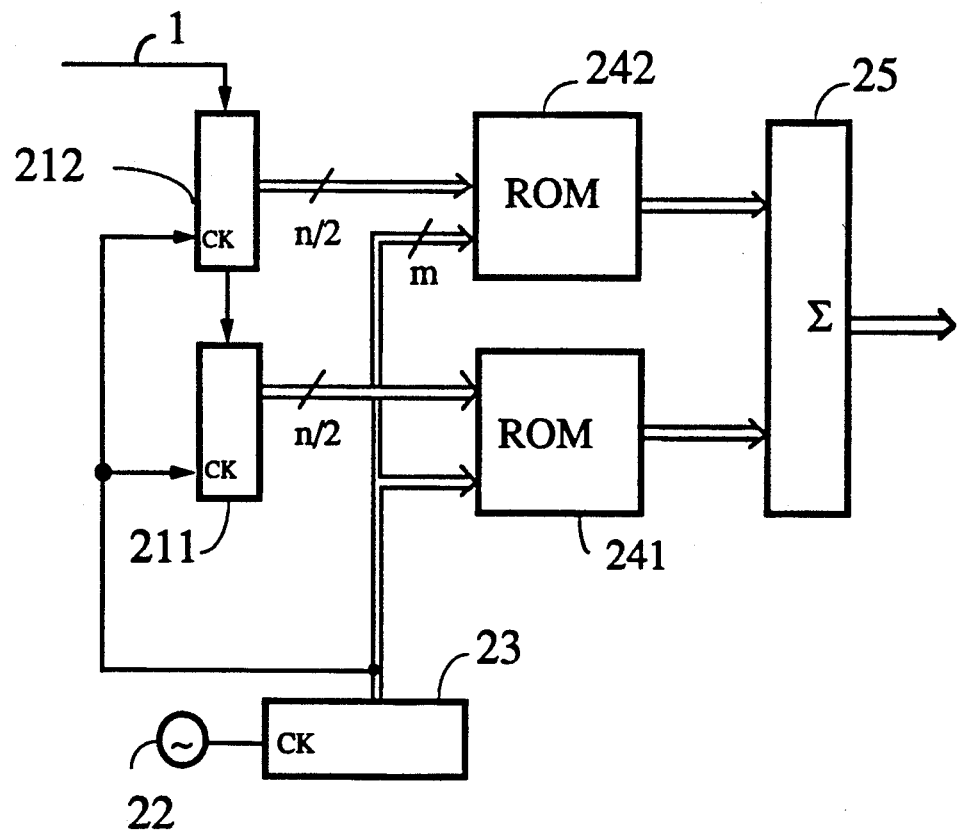
FIG. 10 shows a block diagram of another construction of a ROM LPF of FIG. 8.
Figure 11:
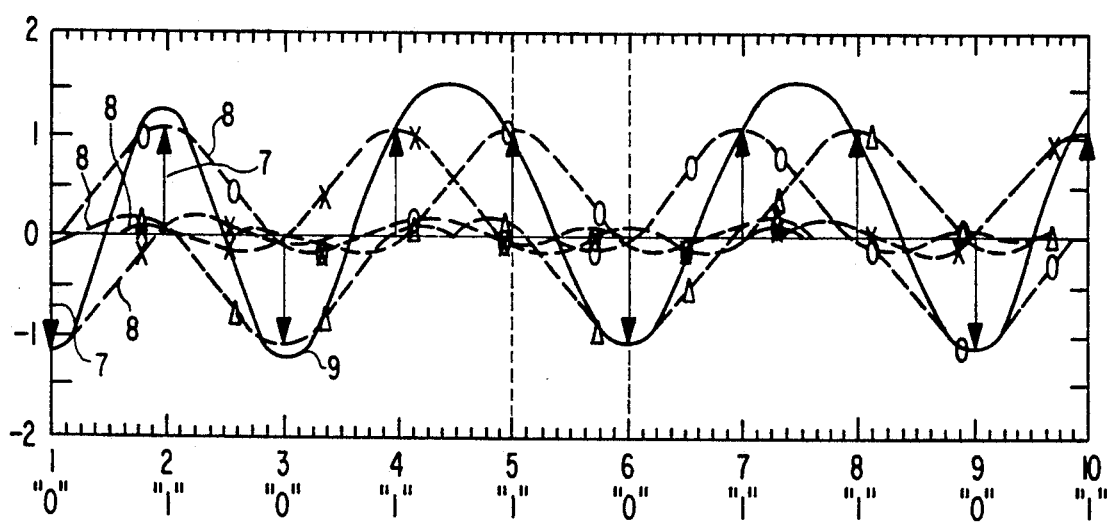
FIG. 11 shows the wave form of the ROM of the FIG. 9.
Figure 12:
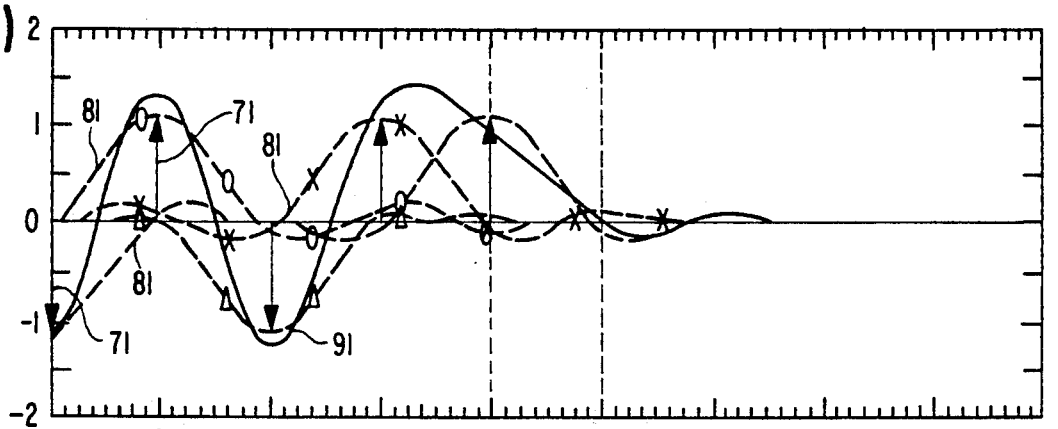
FIG. 12 shows the wave form of the ROM of the FIG. 10.
Figure 12:
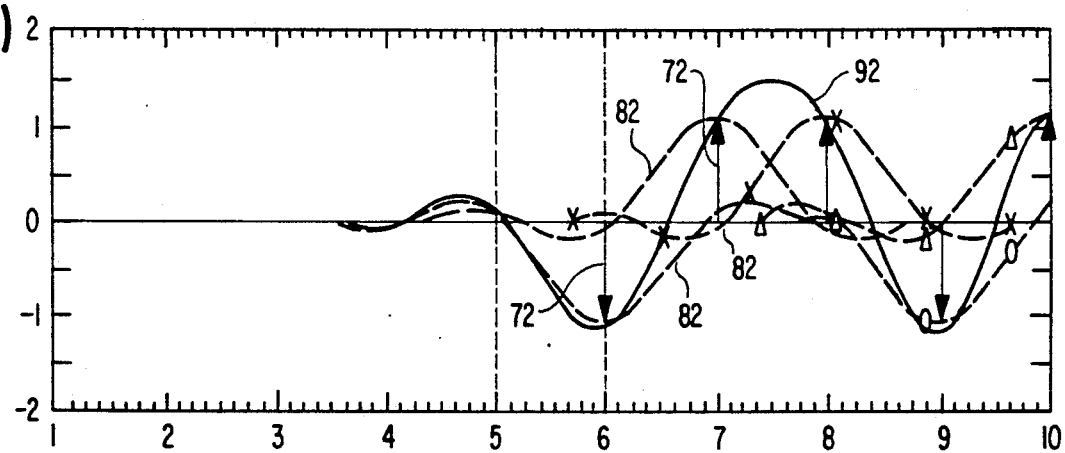

FIG. 3(a) shows the wave form which is read out from the ROM 241 of FIG. 10 at the case of n=10 and the first half five bits are "01011". On the other hand, FIG. 3(b) shows the wave form which is read out from the ROM 242 of FIG. 10 for the case of n=10 and where the second half five bits are "11010". Comparing the two wave form, it is apparent that, if the time axis is reversed, FIG. 3(b) becomes the same as FIG. 3(a). That is, the wave form of the FIG. 3(b) can be obtained by changing the data sequence from "11010" to "01011", and by reversing the counter number which indicates the sampling position, namely by reversing the time axis and reading out the wave form from the ROM 241. As discussed above, by changing the address data, the wave forms of FIG. 3(a) and FIG. 3(b) can be read out from the same ROM 201 as shown in FIG. 2.

Figure 4:
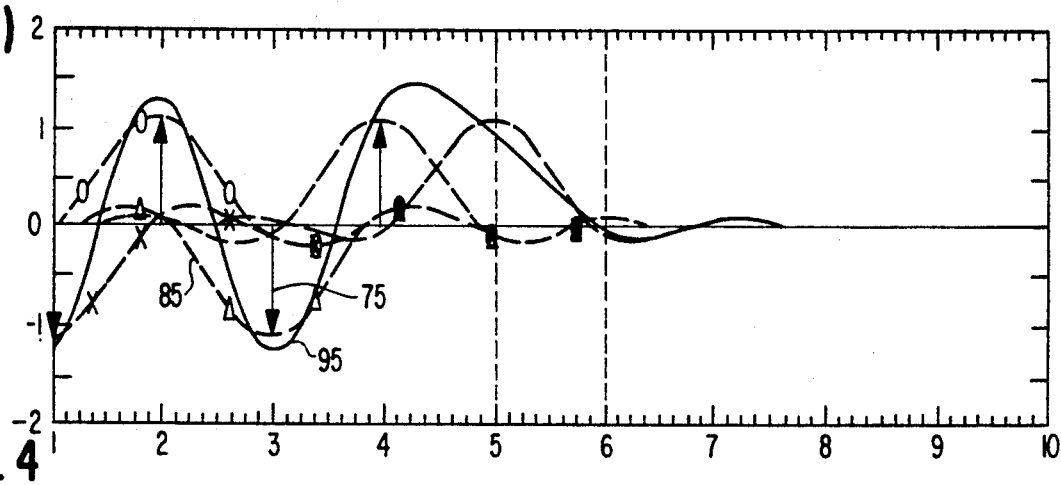
FIG. 4 shows the symmetrical signal wave form in terms of amplitude.
Figure 4:
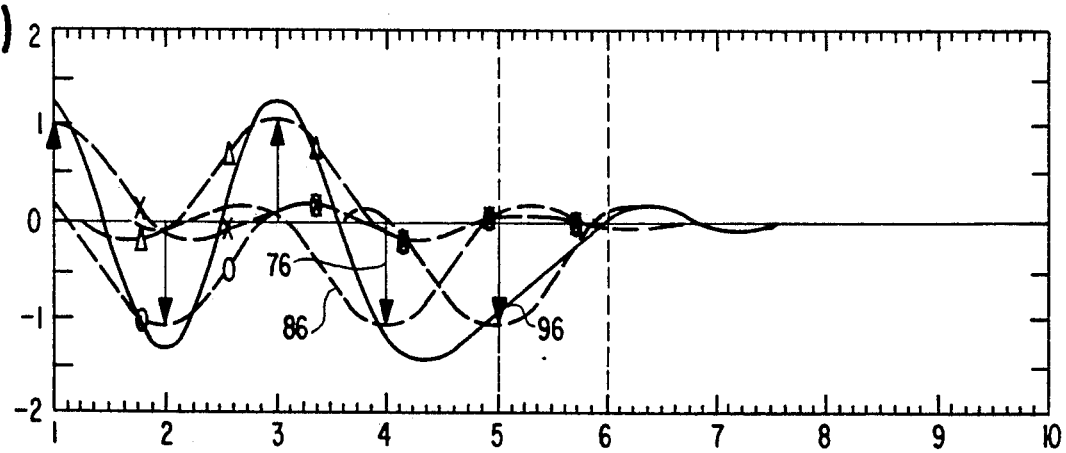

Secondly, it is explained that the required capacity of the ROM is reduced by half compared with the prior art using the amplitude symmetry of the wave form of FIG. 4.

FIG. 4 shows the wave form which explains the amplitude symmetry. In FIG. 4, numbers 75 and 76 are inputted impulse sequences respectively, and numbers 85 and 86 are impulse responses for each input impulse. Numbers 95 and 96 are the output signal wave forms of the filter which convolutes the impulse responses 85 and 86 respectively. FIG. 4(a) shows the wave form which is read out from the ROM 241 of FIG. 10 for the case of n=10 and where the first half five bits are "01011". On the other hand, FIG. 4(b) shows the wave form which is read out from the ROM 241 of FIG. 10 for the case of n=10 and where the first half five bits are "10100" which is the reversed wave form of the FIG. 4(a). Comparing the two wave forms, it is apparent that, by multiplying by (−1), these wave forms are easily transformed each other. The operation for multiplying the wave form by (−1) is attained by inverting each bit and adding 1 to the inverted bits in the case of the two's compliment of the binary. Further, in the case where the wave form is expressed by the sign bit and the absolute value of the remaining bits, the inversion of the amplitude of the wave form is attained only by inverting the sign bit.

As explained above, the operation for multiplying by (−1) is attained easily by simple hardware. Therefore, the required capacity of the ROM is reduced by half by storing the half wave form in the ROM shown in FIG. 4(a), and by multiplying the output wave form by (−1).

The method for reversing the amplitude symmetry wave form is explained hereinafter. For example, the data on the time axis "5" in FIG. 4(a) is continuously supervised, and if the data on the time axis "5" is "0", then the data of the time axis "1"∼"4" are supplied to the ROM 201 as the address data, and if the data on the time axis "5" is "1", then the data of the time axis "1"∼"4" are inverted and supplied to the ROM 201 as the address data. The read out data from the ROM 201 is multiplied by (−1) in the exclusive OR 204.

In FIG. 2, the above two symmetry (time axis and amplitude) process and time division process for I channel and Q channel is used. Therefore, the required capacity of the ROM is reduced by one eighth in comparison with the conventional ROM filter.

The operation of FIG. 2 is explained hereinafter. In FIG. 2, the first half of the input signal $1_i$ is stored in the register $211_i$ and the second half of the signal $1_i$ is stored in the register $212_i$ in the same way as described in FIG. 10. The first half of the input signal $1_q$ is stored in the register $211_q$ and the second half of the signal $1_q$ is stored in the register $212_q$. The first n/2 symbols are obtained from the register $211_i$ and $211_q$, and the second n/2 symbols are obtained from the registers $212_i$ and $212_q$.

A selector 100 selects the input signal from the registers $211_i$, $211_q$, $212_i$ and $212_q$ by the combination of the control signal $S_1$ and $S_0$.

Figure 13:
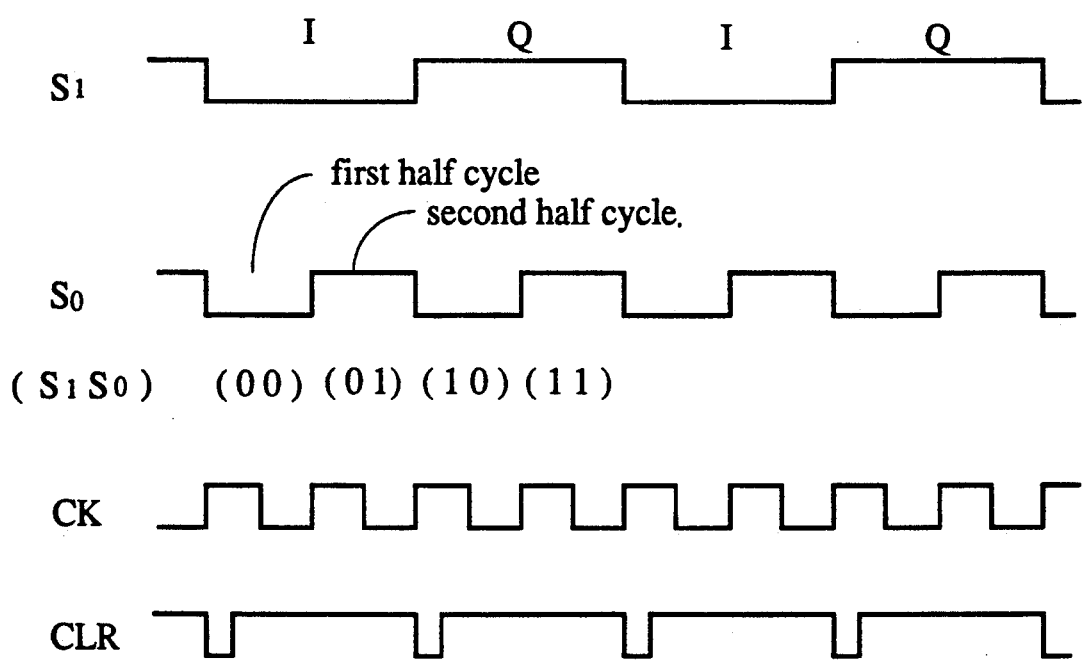
FIG. 13 shows a time chart which gives wave forms for some points in FIG. 2.

FIG. 13 shows a time chart which gives wave forms of the signals $S_1$, $S_0$, latch clock signal CK and clear signal CLR in FIG. 2 and the timing relation between them. Latch clock signal CK and the clear signal CLR are generated in the timing generator 207 of FIG. 2. The select signal $S_1$ switches the I channel and Q channels at a sampling point. The select signal $S_0$ switches the first half symbols and the second half symbols of the I channel and the Q channel at a sampling point. That is, the output of the register $211_i$ is selected when $S_1$ and $S_0$ are (00), and the output of the register $212_i$ is selected when $S_1$ and $S_0$ are (01). In the same way, the output of the register $211_q$ is selected when $S_1$ and $S_0$ are (10) and the output of the register $212_q$ is selected when $S_1$ and $S_0$ are (11).

When the select signal $S_0$ is 1, the outputs from the register $212_i$ and $212_q$ are reversed in order, and also each bit of the output of the time counter 231 is inverted by the select signal $S_0$ (=1) which is inputted to the exclusive-OR 203. The above reverse of the register $212_i$ and the register $212_q$ is executed by changing the connection between the registers $212_i$, $212_q$ and the selector 100. As discussed above, the symmetry of the wave form on the time axis is attained.

The output data selected by the select signal $S_1$ and $S_0$ is separated to a specific bit symbol for indicating the sign of the wave form and the remaining (n/2−1) bit symbols in order to use the symmetry characteristic of the amplitude of the wave form. These remaining (n/2−1) bit symbols are inputted as the address input to the ROM 201. The sign bit is inputted to the exclusive-OR 202 which inverts the address data. Further, the sign bit is inputted to an exclusive-OR 204 and an adder 251. The output data is processed as two's compliment. Multiplication by (−1) is executed at the exclusive-OR 204 and at the adder 251 by applying "1" to the least significant carry bit.

In FIG. 2, the impulse response of the first half of the wave form and the impulse response of the second half of the wave form are processed by time division process. Therefore the output of the I channel and Q channel can not be added at a time as shown in FIG. 10. In this circuit, the addition in the adder 251 is executed as follows.

Firstly, a latch circuit 206 is cleared by the clear pulse CLR received from the timing generator 207 before the first half of the wave form is read out from the ROM 201. After the first half of the wave form is read out from the ROM 201, the latch circuit 206 stores the read out first half of the wave form.

Secondly, the second half of the wave form is read out from the ROM 201. The output from the adder 251 shows the addition result of the first half and the second half of the wave form. As a result, the output wave form processed by the ROM LPF is obtained from the adder 251.

Figure 5:
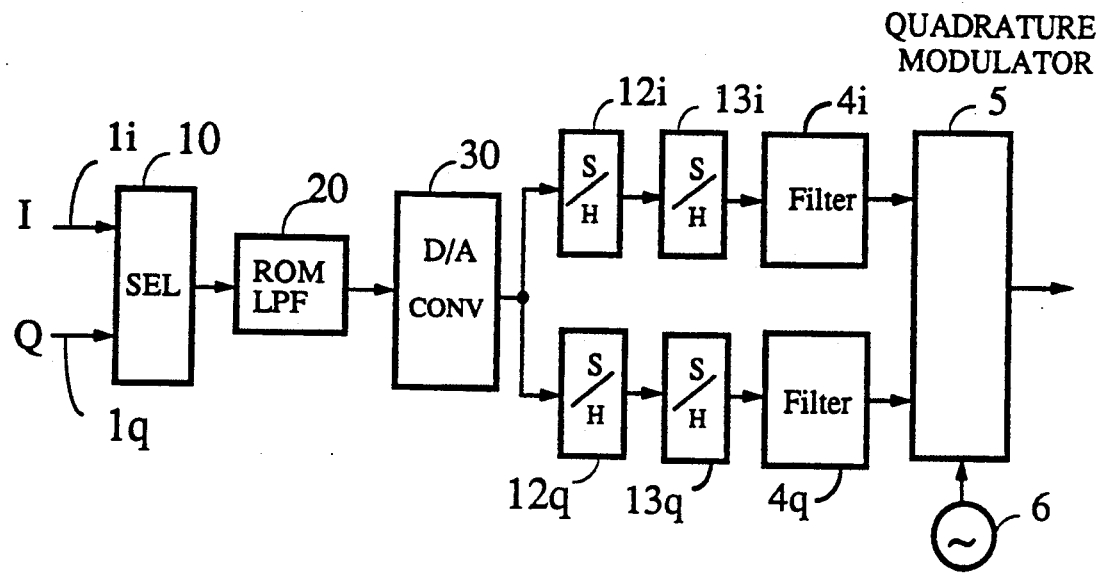
FIG. 5 shows a block diagram of a second embodiment of a quadrature modulation circuit of the present invention.

FIG. 5 shows a block diagram of a second embodiment of a quadrature modulation circuit of the present invention. In FIG. 5, a D/A converter 30 is provided which operates by a time division process for I channel and Q channel.

The output analog signal from the D/A converter 30 is sampled alternately by the sample hold circuits $12i$ and $12q$, demultiplexed into the I channel and the Q channel. The sample hold circuits $13i$ and $13q$ operate by the same timing, and align the phase of the I channel and the Q channel.

The other operations are the same as those described in FIG. 1. Therefore the detailed description is omitted. The above embodiments are described using QPSK, but they may also be applied using other forms of modulation, such as 8 PSK, $\pi/4$ shifted DQPSK and QAM. The advantages of the other applications are the same as with the present embodiments.

Figure 6:
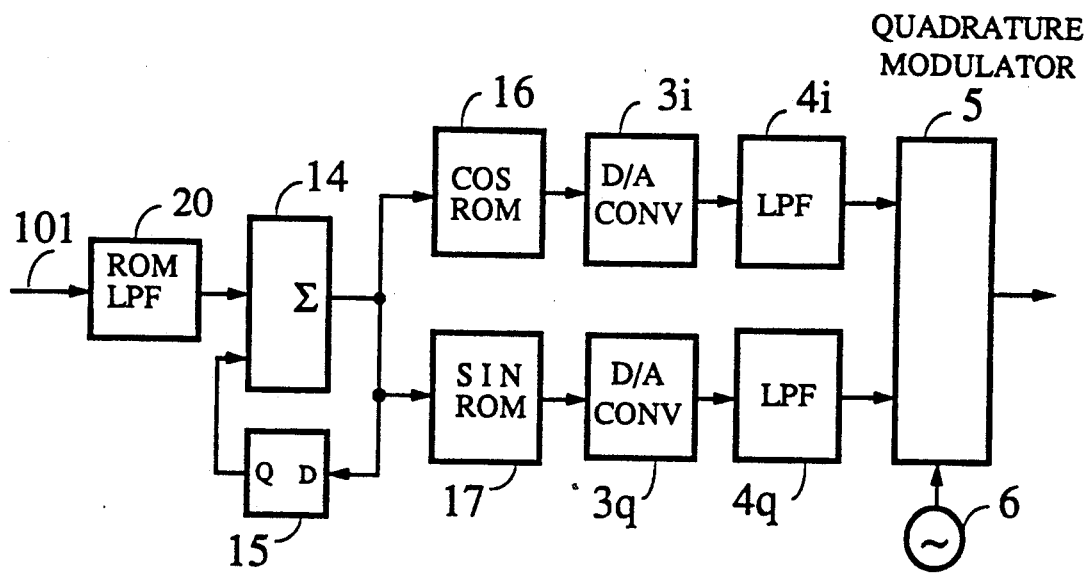
FIG. 6 shows a block diagram of a third embodiment of a quadrature modulation circuit of the present invention.

FIG. 6 shows a block diagram of a third embodiment of a quadrature modulation circuit of the present invention which is applied to the Gaussian filtered minimum phase shift keying modulation (GMSK). In FIG. 6, the same reference numbers as used in FIG. 1 are used to refer to the same portions or the corresponding portions. Accordingly the detailed explanation of such portions is omitted in connection with the same reference numbers.

In FIG. 6, a signal 101 is inputted to a ROM LPF 20. An adder 14 adds the signal from the ROM LPF 20. A latch 15 stores the output signal from the adder 15 which is then added to the succeeding output from the ROM LPF 20. A COS ROM 16 and a SIN ROM 17 convert the output phase from the adder 14 to I channel signal and Q channel signals respectively.

In the case of GMSK, input signal 101 is smoothed in the ROM LPF 20. The output signal from the ROM LPF 20 is integrated in sequence by the adder 14 and the latch 15, and the signal in the frequency domain is converted into the signal in the phase domain. After that, the outputs from the COS ROM 16 and the SIN ROM 17 are converted to analog signals in the D/A converter $3_i$, $3_q$ and supplied to the quadrature modulator 5 through LPF $4_i$ and $4_q$.

Figure 7:
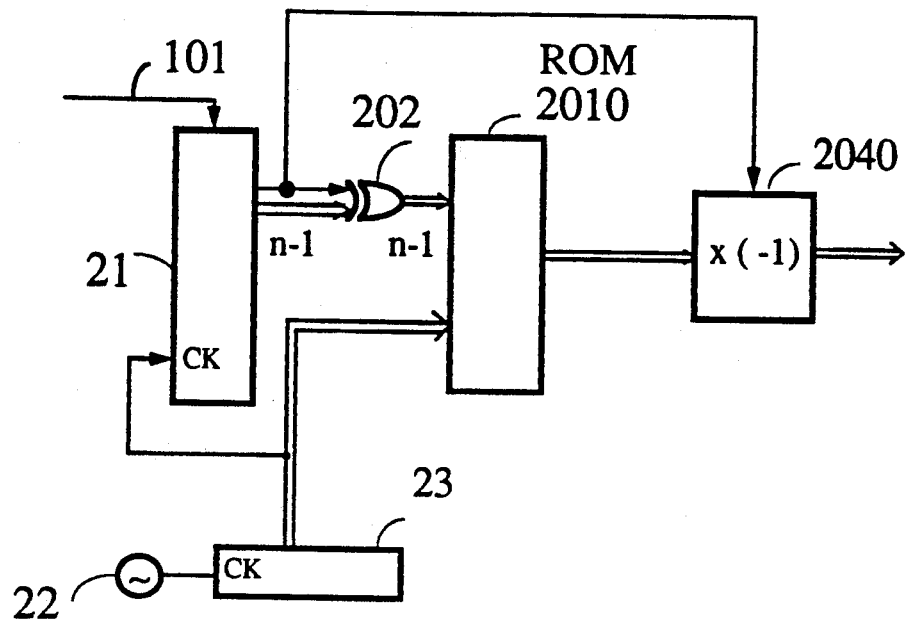
FIG. 7 shows a block diagram of a construction of the ROM LPF of FIG. 6.
Figure 7:
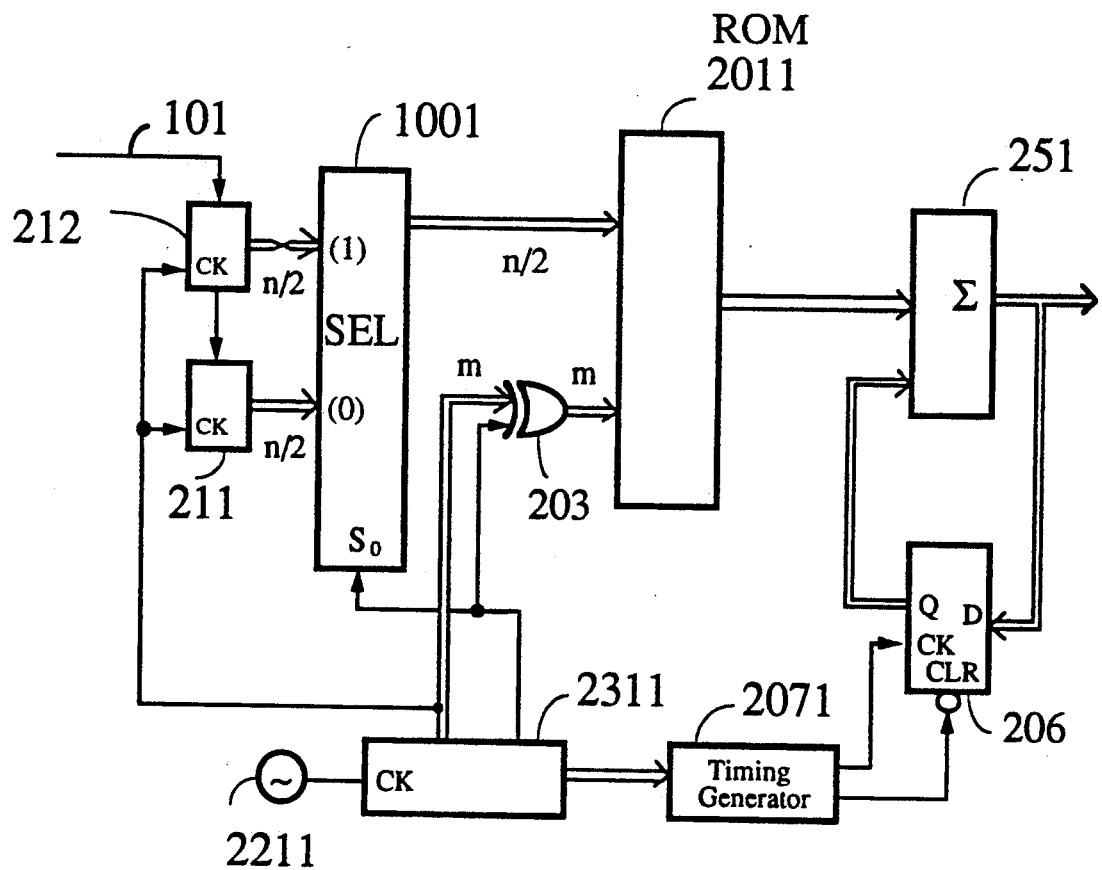
Figure 9:
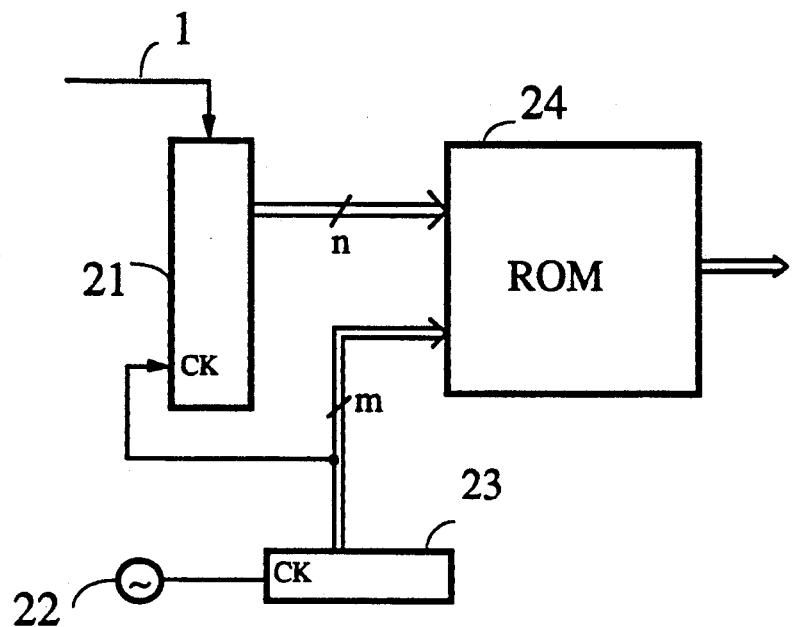
FIG. 9 shows a block diagram of a construction of a ROM LPF of FIG. 8.

FIG. 7 shows a detailed block diagram of the construction of the ROM LPF 20 of FIG. 6 using amplitude symmetry characteristic. In FIG. 7, numeral 2010 is a ROM, numeral 2040 is a calculator which multiplies the output from the ROM 2010 by (−1) selectively. In FIG. 7, the same reference number to the FIG. 2 and FIG. 9 is the same portion or the corresponding portion. Accordingly the detailed explanation of the portion is abbreviated in connection with the same number.

The operation of the embodiment of FIG. 7 is explained hereinafter. The input signal 101 is stored in a shift register 21. One bit of the output signal from the shift register 21 is used as a sign bit and applied to the exclusive-OR 202 and the calculator 2040. The sign bit (1 bit) and the remaining (n−1) bits from the shift register 21 are inputted into the exclusive-OR 202. The remaining (n−1) bits are used as address bits. As discussed above, the output signal from the ROM 2010 is multiplied by (−1) in the calculator 2040 when the sign bit is "1". In this manner, the required capacity of the ROM is reduced by half using amplitude symmetry characteristic.

FIG. 7b shows a detailed block diagram of the construction of the ROM LPF 20 of FIG. 6 using the symmetry on the time axis. In FIG. 7b, 1001 is a selector which selects one of the outputs from the shift registers 211,212. 2011 is a ROM. 2211 is a generator which generates the clock signal. 2311 is a counter which counts the clock signal. 2071 is a timing generator which generates a latch clock and a clear signal.

In FIG. 7b, the same reference numbers as used in FIG. 2 are used to refer to the same portions or corresponding portions. Accordingly the detailed explanation of such portions is omitted in connection with the same reference numbers.

The operation of the embodiment of FIG. 7b is explained hereinafter. The input signal 101 is stored in shift registers 211 and 212. The first half n/2 symbols of the input signal 101 is stored in the shift register 211 and the second half n/2 symbols of the input signal 101 is stored in the shift register 212. The select input signal $S_0$ selects the first half n/2 symbols or the second half n/2 symbols, that is, the output of the register 211 or 212. When the select input signal $S_0$ is "1", the selector 1001 selects the second half n/2 symbols from the register 212. In order to use symmetry on the time axis, the output from the register 212 is reversed and the counter data from the counter 2311 is also inverted in the exclusive-OR 203 by the $S_0$ bit as explained in connection with FIG. 2.

The impulse responses of the first half wave form and the second half wave form are read from the ROM 2011 by time division process. The output data from the ROM 2011 is added in the same way using the adder 251 and the latch 206 as described in connection with FIG. 2. As a result, the filter output wave form is obtained from the output of the adder 251.

In this manner, the required capacity of the ROM is reduced by half using symmetry wave form on the time axis.

The above embodiment are described for applying GMSK, but it may be applied to the tamed FM and other digital FM modulation systems. The advantages of the other applications are the same as in this embodiment.

What is claimed is:

1. A quadrature modulation circuit including at least a low pass filter using ROM for limiting the frequency band-width of the in-phase channel and the quadrature channel, at least a D/A converter for converting the digital signal received from said low pass filter to an analog signal, at least a filter for suppressing the aliases outputted from said D/A converter, a quadrature modulator for modulating a carrier signal with the output from said filter:
   wherein said low pass filter includes time division process means for time division operation of said filter for the in-phase channel and the quadrature channel with the same band-width limiting characteristic for both the in-phase channel and the quadrature-phase channel.

2. A quadrature modulation circuit including at least a low pass filter using ROM for limiting the frequency band-width of the in-phase channel and the quadrature channel, at least a D/A converter for converting the digital signal received from said low pass filter to an analog signal, at least a filter for suppressing the aliases outputted from said D/A converter, a quadrature modulator for modulating a carrier signal with the output from said filter:
   wherein said low pass filter includes means for using one symbol of data in a symbol data as a sign data, and for inverting the sign of the remaining symbols of data in said symbol data and the output data from said ROM by using said one symbol data.

3. A quadrature modulation circuit including at least a low pass filter using ROM for limiting the frequency band-width of the in-phase channel and the quadrature channel, at least a D/A converter for converting the digital signal received from said low pass filter to an analog signal, at least a filter for suppressing the aliases outputted from said D/A converter, a quadrature modulator for modulating a carrier signal with the output from said filter:
   ·wherein said low pass filter includes means for dividing the data into a first half portion and a second half portion, and for reading out contents of the ROM along the forward direction of the time axis for said first half portion, and along the backward direction of the time axis for said second half portion.

4. A quadrature modulation circuit of claim 1:
   wherein said D/A converter converts the digital signal received from said low pass filter to an analog signal by time division process.

5. A quadrature modulation circuit of claim 1:
   wherein said low pass filter, also uses one symbol data in a symbol data as a sign data, and inverts the sign of the remaining symbol data and an output data from a ROM by using said one symbol data.

6. A quadrature modulation circuit of claim 5:

wherein said D/A converter converts the digital signal received from said low pass filter to an analog signal by time division process.

7. A quadrature modulation circuit of claim 5: wherein said low pass filter, further divides the data into the first half portion and the second half portion, and reads out contents of the ROM for forward direction of the time axis at said first half portion, and for backward direction of the time axis at said second half portion.

8. A quadrature modulation circuit of claim 7: wherein said D/A converter converts the digital signal received from said low pass filter to an analog signal by time division process.

9. A quadrature modulation circuit of claim 1: wherein said low pass filter, further divides the data into the first half portion and the second half portion, and reads out contents of the ROM for forward direction of the time axis at said first half portion, and for backward direction of the time axis at said second half portion.

10. A quadrature modulation circuit of claim 9: wherein said D/A converter converts the digital signal received from said low pass filter to an analog signal by time division process.

11. A quadrature modulation circuit of claim 2: wherein said low pass filter, further divides the data into the first half portion and the second half portion, and reads out contents of the ROM for forward direction of the time axis at said first half portion, and for backward direction of the time axis at said second half portion.

12. A quadrature modulation circuit of claim 11: wherein said D/A converter converts the digital signal received from said low pass filter to an analog signal by time division process.

13. A quadrature modulation circuit including at least a low pass filter for limiting the frequency band-width of the base-band signal to be frequency-modulated, an adder for adding the output of said low pass filter, a latch circuit for adding the output of said adder to the preceding output of said adder, a COS ROM and a SIN ROM for converting the phase value of the output from said adder to an in-phase channel signal and a quadrature channel signal respectively, D/A converters for converting the digital signal received from said COS ROM or SIN ROM respectively, at least a filter for suppressing the aliases outputted from said D/A converter, a quadrature modulator for modulating carrier signal with the output from said filter:

wherein said low pass filter includes means for using one symbol of data in a symbol data as a sign data, and for inverting the sign of the remaining symbols of data in said symbol data and the output data from said ROM by using said one symbol data.

14. A quadrature modulation circuit including at least a low pass filter using ROM for limiting the frequency band-width of the base-band signal to be frequency modulated, an adder for adding the output of said low pass filter, a latch circuit for adding the output of said adder to the preceding output of said adder, a COS ROM and a SIN ROM for converting the phase value of the output from said adder to an in-phase channel signal and a quadrature channel signal respectively, D/A converters for converting the digital signal received from said COS ROM or SIN ROM respectively, at least a filter for suppressing the aliases outputted from said D/A converter, a quadrature modulator for modulating the output from said filter:

wherein said low pass filter includes means for dividing the data into a first half portion and a second half portion, and for reading out contents of the ROM along the forward direction of the time axis for said first half portion, and along the backward direction of the time axis for said second half portion.

* * * * *

UNITED STATES PATENT AND TRADEMARK OFFICE
CERTIFICATE OF CORRECTION

PATENT NO. : 5,285,479
DATED : February 8, 1994
INVENTOR(S) : Yasushi Iwane

It is certified that error appears in the above-identified patent and that said Letters Patent is hereby corrected as shown below:

Col. 3, line 16, delete "b".

Signed and Sealed this

Twenty-sixth Day of July, 1994

Attest:

BRUCE LEHMAN

Attesting Officer    Commissioner of Patents and Trademarks